United States Patent [19]
Davies et al.

[11] Patent Number: 5,953,311
[45] Date of Patent: Sep. 14, 1999

[54] TIMING SYNCHRONIZATION IN A RECEIVER EMPLOYING ORTHOGONAL FREQUENCY DIVISION MULTIPLEXING

[75] Inventors: David Huw Davies, Bristol; Jonathan Parker; Anthony Peter John Claydon, both of Bath, all of United Kingdom

[73] Assignee: Discovision Associates, Irvine, Calif.

[21] Appl. No.: 08/802,328

[22] Filed: Feb. 18, 1997

[51] Int. Cl.[6] .............................. H04J 11/00; H04J 3/06
[52] U.S. Cl. ..................... 370/210; 370/350; 370/503
[58] Field of Search .................................. 370/203, 206, 370/208, 210, 350, 503, 504

[56] References Cited

U.S. PATENT DOCUMENTS

| 5,175,617 | 12/1992 | Wallace et al. | 358/133 |
|---|---|---|---|
| 5,283,646 | 2/1994 | Bruder | 348/415 |
| 5,579,346 | 11/1996 | Kanzaki | 375/344 |

FOREIGN PATENT DOCUMENTS

| 0608024 | 7/1994 | European Pat. Off. | H04J 13/00 |
|---|---|---|---|
| 0730357 | 9/1996 | European Pat. Off. | H04L 5/06 |
| 0772332 | 5/1997 | European Pat. Off. | H04L 27/26 |

OTHER PUBLICATIONS

Alard, M., R. Lassalle. "Principles of Modulation and Channel Coding for Digital Broadcasting for Mobile Receivers." EBU Review—Technical No. 224, Aug. 1987, pp. 168–190.
Bennett C. Wong and Henery Samueli, "A 200–MHZ All-Digital QAM Modulator and Demodulator in 1.2–$\mu$m CMOS for Digital Radio Applications," IEEE Journal of Solid–State Circuits, vol. 26, No. 12, Dec. 1991.
Bingham, John A.C. "Multicarrier Modulation for Data Transmission: An Idea Whose Time Has Come." IEEE Communications Magazine, May 1990, pp. 5–14.
Braun, Stefen. Joachim Speidel. "High Level Modulation Schemes for Digital TV and Multimedia Transmission in CATV–Networks." Telecommunications Institute, Stuttgart University, 1995. pp. 751–763.
Bretl, Wayne. Richard Citta. "Single Carrier VSB Digital Televesion Transmission, Single–Frequency Networks, and Repeater Systems." Zenith Electronics Corp. IEEE Transactions on Consumer Electronics, vol. 42, No. 1, Feb. 1996, pp. 1–10.
Chow, Jacky S. Jerry C. Tu and John M. Cioffi. "A Discrete Multitone Transceiver System for HDSL Applications." IEEE Journal on Selected Areas in Communications, vol. 9, No. 6, Aug. 1991, pp. 895–908.
Cimini, Leonard J. "Analysis and Simulation of a Digital Mobile Channel Using Orthogonal Frequency Division Multiplexing." IEEE Transactions on Communications, vol. COM–33, No. 7, Jul. 1985. pp. 665–675.
Citta, Rich; Ron Lee, Practical Implementation of a 43 mbit/sec. (8 bit/HZ) Digital Modem for Cable Television. NCTA Technical Papers 1993 pp. 271–279, Zenith Electronics Corporation, Glenview, IL 60025.

(List continued on next page.)

*Primary Examiner*—Douglas W. Olms
*Assistant Examiner*—David R Vincent
*Attorney, Agent, or Firm*—Keiji Masaki; Donald Bollella; Clay E. Gaetje

[57] ABSTRACT

A method and apparatus are disclosed for determining the boundaries of guard intervals of data symbols being received in a coded orthogonal frequency division multiplexed signal. Temporal samples separated by an interval of an active interval of a data symbol are associated in pairs, and difference signals obtained. The dispersion of a first comparison block of difference signals is determined, and compared to the dispersion of a second comparison block of difference signals, the second comparison block being displaced from the first comparison block by n samples. An F ratio is calculated for the dispersions of the two blocks. F ratios are iterated in a succession of comparison blocks, and a signal representing the F ratios subjected to peak detection. The peaks represent the boundaries of the symbol's guard interval. This information is utilized in synchronizing an FFT window for subsequent signal reconstruction.

42 Claims, 9 Drawing Sheets

OTHER PUBLICATIONS

Classen, Ferdinand. Heinrich Meyr. "Frequency Synchronization Algorithms for OFDM Systems Suitable for Communication Over Frequency Selective Fading Channels." IEEE Transactions, Mar. 1994, pp. 1655–1659.

De Bot, Paul G.M. Bernard Le Floch, Vittoria Mignone and Hans–Dieter Shutte. "An Overview of the Modulation and Channel Coding Schemes Developed for Digital Terrestrial Television Broadcasting Within the dTTb Project." IEE Convention Publication No. 397, 1994 International Broadcasting Convention Sep. 16–20, 1994, pp. 569–576.

Dosch, CH. P.A. Ratliff, D. Pommier. "First Public Demonstrations of COFDM/MASCAM. A Milestone for the Future of Radio Broadcasting." EBU Review—Technical No. 232, Dec. 1988, pp. 275–283.

European Telecommunications Standards Institute "European Telecommunication Standard: Digital Broadcasting Systems for Television, Sound and Data Services; Framing Structure, Channel Coding and Modulation for Digital Television." Valbonne, France. May 1996, pp. 1–40.

Gledhill, J.J. "Systems for Digital Terrestrial Broadcasting." Advanced Products Division, NTL. 1995, pp. 1–6.

Halbert–Lassalle, Roselyn. Bernard Le Floch, Damien Castelain. "Digital Sound Broadcasting to Mobile Receivers." IEEE Transactions on Consumer Electronics, vol. 35. No. 3, Aug. 1989, pp. 493–503.

Jeanclaude, I. H. Sari, G. Karam. "An Analysis of Orthogonal Frequency–Division Multiplexing for Mobile Radio Applications." IEEE Transactions 0–7803–1927–3/94. pp. 1635–1639.

Kaiser, Stefen. "On the Performance of Different Detection Techniques for OFDM–CDMA in Fading Channels." IEEE Transactions 0–7803–2509–5/95, May 1995. pp. 2059–2063.

Karam, Georges. Kikmet Sari, Isabelle Jeanclaude. "Transmission Techniques for Digital Terrestrial TV Broadcasting." IEEE Communications Magazine, Feb. 1995. pp. 100–108.

Le Floch, Bernard. Michel Alard, Claude Berrou. "Coded Orthogonal Frequency Division Multiplex." Proceedings of the IEEE, vol. 83, No. 6, Jun. 1995, pp. 982–996.

Le Goff, Stephane. Alain Glavieux and Claude Berrou. "Turbo–Codes and High Spectral Efficiency Modualtion." Telecom Bretagne, France Telecom University, IEEE 0–7802–1825–0/94, 1994. pp. 645–649.

Linnartz, Jean–Paul. "Special Issue on Multi–Carrier Modulation." Wireless Personal Communication, Kluwer, Philips Research, Eindhoven, Jan. 1996. pp. 1–6.

Maddocks, M.C.D. "Digital Modulation." BBC Engineering Research Department. The Institution of Electrical Engineers, May 26, 1993. pp. 1–13.

Maddocks, M.C.D. "An Introduction to Digital Modulation and OFDM Techniques." BBC Research Department, Surrey, U.K. pp. 1–10.

Massey, James L. "Optimum Frame Synchronization." IEEE Transactions on Communications, vol. COM–20, No. 2, Apr. 1972. pp. 115–119.

Meyr, H., Ascheid, G. "Fully Digital Receiver for 100Mbit/S 8–PSK TCM Coded Transmission (DIRECS)," Course 577 Advanced Digital Receivers for Mobile Communications: Algorithm, Design Methodology and DSP–Tools, Technologies CEI–Europe Oct. 2–5, 1995, Italy; Mar. 25–29, 1996, Switzerland.

Muller, A. "OFDM Transmission Over Time–Variant Multipath Channels." Daimler Benz Research Center, Ulm Germany. International Broadcasting Convention Sep. 16–20, 1994. IEE Conference Publication No. 397 1994. pp. 533–538.

Muschalik, Claus. "Influence of RF Oscillators on an OFDM Signal." Thomson Multimedia. IEEE Transacions on Consumer Electronics, vol. 41, No. 3, Aug. 1995. pp. 592–603.

Pollet, Thierry. Mark Van Bladel, and Marc Moeneclaey. "BER Sensitivity of OFDM Systems to Carrier Frequency Offset and Wiener Phase Noise." IEEE Transactions on Communications OL 43, No. 2/3/4 Feb./Mar./Apr. 1995. pp. 191–193.

Polley, Michael O. William F. Schreiber, Susie J. Wee. "Comments on 'Transmission Techniques for Digital Terrestrial TV Broadcasting.'" IEEE Communications Magazine, Nov. 1995, pp. 22–26.

Pommier, D. and Yi Wu. "Interleaving or Spectrum–Spreading in Digital Radio Intended for Vehicles." EBU Review—Technical, No. 217, Jun. 1986. pp. 128–142.

Sari, H. G. Karam, and I. Jeanclaude. Sat,Division Telecommunciations. "Frequency–Domain Equalization of Mobile Radio and Terrestrial Broadcast Channels." IEEE Transactions 0–7803–1820–X/94, 1994. pp. 1–5.

Shelswell, P. "The COFDM Modulation System: The Heart of Digital Audio Broadcasting." Electronics & Communication Engineering Journal, Jun. 1995. pp. 127–136.

Shelswell, Peter. John Zubrzycki and Richard Evans. "Mobile and Portable Reception of Satellite–Delivered DAB." BBC Research and Development Department, 1996. pp. 1–8.

Stuber, Gordon L. and Mark Russell. "Terrestrial Digital Video Broadcasting for Mobile Reception Using OFDM." IEEE Transactions 0–7803–2509–5/95, May 1995, pp. 2049–2053.

Sueur, B. D. Castelain. "Limits of COFDM Technology for Digital Terretrial Television Broadcasting: Theoretical Considerations and Practical Measurements." Centre Commun d'Etudes de Telecommunications et Telediffusion. 1995 pp. 323–353.

Van de Beek, Jan–Jap. Ove Edfors, Magnus Sandell, Sarah Kate Wilson, Per Ola Borjesson. "On Channel Estimation in OFDM Systems." IEEE Transactions, 0–7803–2742–X/95, 1995, pp. 815–819.

Wu, Yiyan. William Y. Zou. "Orthogonal Frequency Division Multiplexing: A Multi–Carrier Modulation Scheme." IEEE Transactions on Consumer Electronics, vol. 41, No. 3, Aug. 1995, pp. 392–397.

Yamazaki, Shigeru. "Towards the Implementation of Digital Terrestrial TV Broadcasting." Science & Technology Research Laboratories, NHK, Tokyo, Japan. 1995 pp. 290–297.

Zou, William Y., Yiyan Wu. "COFDM: An Overview." IEEE Transactions on Broadcasting, vol. 41, No. 1, Mar. 1995, pp. 1–8.

X IDEAL CONSTELLATION SAMPLES   ⊛ PERTURBED SAMPLES

TIMING SYNCHRONIZATION IN A RECEIVER EMPLOYING ORTHOGONAL FREQUENCY DIVISION MULTIPLEXING

BACKGROUND OF THE INVENTION

1. Field of the Invention

This invention relates to receivers of electromagnetic signals employing multicarrier modulation. More particularly this invention relates to synchronization of a timed interval which is required for the calculation of a fast Fourier transform in a receiver employing orthogonal frequency division multiplexing.

2. Description of the Related Art

Coded orthogonal frequency division multiplexing ("COFDM") has been proposed for digital audio and digital video broadcasting, both of which require efficient use of limited bandwidth, and a method of transmission which is reliable in the face of several effects. For example the impulse response of a typical channel can be modeled as the sum of a plurality of Dirac pulses having different delays. Each pulse is subject to a multiplication factor, in which the amplitude generally follows a Rayleigh law. Such a pulse train can extend over several microseconds, making unencoded transmission at high bit rates unreliable. In addition to random noise, impulse noise, and fading, other major difficulties in digital terrestrial transmissions at high data rates include multipath propagation, and adjacent channel interference, where the nearby frequencies have highly correlated signal variations. COFDM is particularly suitable for these applications. In practical COFDM arrangements, relatively small amounts of data are modulated onto each of a large number of carriers that are closely spaced in frequency. The duration of a data symbol is increased in the same ratio as the number of carriers or subchannels, so that inter-symbol interference is markedly reduced.

Multiplexing according to COFDM is illustrated in FIGS. 1 and 2, wherein the spectrum of a single COFDM carrier or subchannel is indicated by line 2. A set of carrier frequencies is indicated by the superimposed waveforms in FIG. 2, where orthogonality conditions are satisfied. In general two real-valued functions are orthogonal if $$\int_a^b \psi_p(t)\psi_q^*(t)dt = K \quad (1)$$

where K is a constant, and K=0 if p≠q; K≠0 if p=q. Practical encoding and decoding of signals according to COFDM relies heavily on the fast Fourier transform ("FFT"), as can be appreciated from the following equations.

The signal of a carrier c is given by $$s_c(t) = A_c(t)e^{j[\omega_c t + \phi_c(t)]} \quad (2)$$

where $A_c$ is the data at time t, $\omega_c$ is the frequency of the carrier, and $\phi_c$ is the phase. N carriers in the COFDM signal is given by $$s_s(t) = (1/N)\sum_{n=0}^{N} A_n(t)e^{j[\omega_n(t)+\phi_n(t)]} \quad (3)$$

$$\omega_n = \omega_0 + n\Delta\omega \quad (4)$$

Sampling over one symbol period, then $$\phi_c(t) => \phi_n \quad (5)$$

$$A_c(t) => A_n \quad (6)$$

With a sampling frequency of 1/T, the resulting signal is represented by $$s_s(t) = (1/N)\sum_{n=0}^{N} A_n(t)e^{j[(\omega_n+n\Delta\omega)kT+\phi_n]} \quad (7)$$

Sampling over the period of one data symbol T=NT, with $\omega_0=0$, $$s_s(kT) = (1/N)\sum_{n=0}^{N-1} A_n e^{j\phi_n} e^{j(n\Delta\omega)kT} \quad (8)$$

which compares with the general form of the inverse discrete Fourier transform:

$$g(kT) = (1/N)\sum_{n=0}^{N-1} G(n/(kT))e^{j\pi n(k/N)} \quad (9)$$

In the above equations $A_n e^{j\Phi_n}$ is the input signal in the sampled frequency domain, and $s_s(kT)$ is the time domain representation. It is known that increasing the size of the FFT provides longer symbol durations and improves ruggedness of the system as regards echoes which exceed the length of the guard interval. However computational complexity increases according to $N\log_2 N$, and is a practical limitation.

In the presence of intersymbol interference caused by the transmission channel, orthogonality between the signals is not maintained. One approach to this problem has been to deliberately sacrifice some of the emitted energy by preceding each symbol in the time domain by an interval which exceeds the memory of the channel, and any multipath delay. The "guard interval" so chosen is large enough to absorb any intersymbol interference, and is established by preceding each symbol by a replication of a portion of itself. The replication is typically a cyclic extension of the terminal portion of the symbol. Referring to FIG. 3, a data symbol 4 has an active interval 6 which contains all the data transmitted in the symbol. The terminal portion 8 of the active interval 6 is repeated at the beginning of the symbol as the guard interval 10. The COFDM signal is represented by the solid line 12. It is possible to cyclically repeat the initial portion of the active interval 6 at the end of the symbol.

Transmission of COFDM data can be accomplished according to the known general scheme shown in FIG. 4. A serial data stream 14 is converted to a series of parallel streams 16 in a serial-to-parallel converter 18. Each of the parallel streams 16 is grouped into x bits each to form a complex number, where x determines the signal constellation of its associated parallel stream. After outer coding and interleaving in block 20 pilot carriers are inserted via a signal mapper 22 for use in synchronization and channel estimation in the receiver. The pilot carriers are typically of two types. Continual pilot carriers are transmitted in the same location in each symbol, with the same phase and amplitude. In the receiver, these are utilized for phase noise cancellation, automatic frequency control, and time/sampling synchronization. Scattered pilot carriers are distributed throughout the symbol, and their location typically changes from symbol to symbol. They are primarily useful in channel estimation. Next the complex numbers are modulated at baseband by the inverse fast fourier transform ("IFFT") in block 24. A guard interval is then inserted at block 26. The discrete symbols are then converted to analog, typically low-pass filtered, and then upconverted to radiofrequency in block 28. The signal is then transmitted through a channel 30 and received in a receiver 32. As is well known in the art, the receiver applies an inverse of the transmission process to obtain the transmitted information. In particular an FFT is applied to demodulate the signal.

A modern application of COFDM has been proposed in the European Telecommunications Standard DRAFT pr ETS 300 744 (May 1996), which specifies the framing structure, channel coding, and modulation for digital terrestrial television. The specification was designed to accommodate digital terrestrial television within the existing spectrum allocation for analog transmissions, yet provide adequate protection against high levels of co-channel interference and adjacent channel interference. A flexible guard interval is specified, so that the system can support diverse network configurations, while maintaining high spectral efficiency, and sufficient protection against co-channel interference and adjacent channel interference from existing PAL/SECAM services. The noted European Telecommunications Standard defines two modes of operation. A "2K mode", suitable for single transmitter operation and for small single frequency networks with limited transmitter distances. An "8K mode" can be used for either single transmitter operation or for large single frequency networks. Various levels of quadrature amplitude modulation ("QAM") are supported, as are different inner code rates, in order to balance bit rate against ruggedness. The system is intended to accommodate a transport layer according to the Moving Picture Experts Group ("MPEG"), and is directly compatible with MPEG-2 coded TV signals (ISO/IEC 13818).

In the noted European Telecommunications Standard data carriers in a COFDM frame can be either quadrature phase shift keyed ("QPSK"), 16-QAM, 64-QAM, non-uniform 16-QAM, or non-uniform 64-QAM using Gray mapping.

An important problem in the reception of COFDM transmission is difficulty in maintaining synchronization due to phase noise and jitter which arise from upconversion prior to transmission, downconversion in the receiver, and the front end oscillator in the tuner, which is typically a voltage controlled oscillator. Except for provision of pilot carriers to aid in synchronization during demodulation, these issues are not specifically addressed in the noted European Telecommunications Standard, but are left for the implementer to solve.

Basically phase disturbances are of two types. First, noisy components which disturb neighbor carriers in a multicarrier system are called the "foreign noise contribution" ("FNC"). Second, a noisy component which disturbs its own carrier is referred to as the "own noise contribution".

Referring to FIG. 5, the position of ideal constellation samples are indicated by "x" symbols 34. The effect of foreign noise contribution is stochastic, resulting in Gaussian-like noise. Samples perturbed in this manner are indicated on FIG. 5 as circles 36. The effects of the own noise contribution is a common rotation of all constellation points, indicated as a displacement between each "x" symbol 34 and its associated circle 36. This is referred to as the "common phase error", which notably changes from symbol to symbol, and must therefore be recalculated each symbol period $T_s$. The common phase error may also be interpreted as a mean phase deviation during the symbol period $T_s$.

In order for the receiver 32 to process the data symbols in a practical system, a mathematical operation is performed on the complex signal representing each data symbol. Generally this is an FFT. For valid results to be obtained, a particular form of timing synchronization is required in order to align the FFT interval with the received data symbol.

SUMMARY OF THE INVENTION

It is therefore a primary object of the present invention to provide an improved method of synchronizing a received data symbol with an FFT window in signals transmitted according to COFDM.

It is another object of the invention to improve the terrestrial transmission of COFDM signals.

It is yet another object of the invention to provide improved apparatus for the reception of COFDM signals.

These and other objects of the present invention are attained by a method of decoding a stream of data symbols having a symbol period $T_s$. The symbols define an active interval and a guard interval wherein the guard interval is a replication of a portion of the active interval, and is preferably a cyclic extension of a terminal portion thereof. The stream is sampled during an evaluation interval of the symbol period $T_s$. Samples are associated in pairs, wherein the members of a pair are separated in the data stream by the active interval. The paired data lie in first and second blocks respectively, each block being no larger than the guard interval. For each data pair a function is determined, preferably the difference of the pair members, and output as a first output signal. The dispersion of the first output signals is then measured and output as a second output signal. The first block and the second block are then displaced together relative to the stream, and the preceding steps of associating samples, determining a function, and measuring a dispersion are repeated. The result is output as a third output signal. The second output signal is compared with the third output signal, and the result output as a fourth output signal. A predetermined criterion in the fourth output signal, which indicates the boundaries of the guard interval and the active interval, is then detected. The criterion may be a predetermined magnitude, a maximum, or a minimum.

Preferably the modulus of the samples is calculated. However according to an aspect of the invention only the real or the imaginary component of the stream need be sampled.

The F ratio is used to compare the second and the third output signals of two comparison blocks. Preferably the logarithms of the numerator and denominator of the F ratio are subtracted to evaluate the F ratio. The F ratios of succeeding sets of comparison blocks are evaluated for peaks which are indicative of guard interval boundaries. The determination of the peaks may include tests of statistical significance.

In a first operating mode the evaluation interval has a fixed first value, and in a second operating mode, the evaluation interval has a second value, allowing adaptation to changing signal conditions. According to an aspect of the invention in the second operating mode a dispersion of the location of the guard interval in successive symbols is stored, and the value of the evaluation interval is adjusted in response to the memorized dispersion.

According to another aspect of the invention following the detection of a boundary in the guard interval, a new set of samples is sampled and accepted for an active interval before initiating the detection of a guard interval boundary in a following symbol.

The invention provides a demodulator for a frequency division multiplexed signal, wherein the signal is a stream of data symbols having a symbol period $T_s$, and the symbols define an active interval and a guard interval. The guard interval is a replication of a portion of the active interval, preferably a cyclic extension of the terminal portion thereof. A timing synchronization circuit is provided in the demodulator for locating a boundary of the guard interval. The circuit has a first delay circuit, preferably realized as a first-in-first-out memory ("FIFO"), connected to the input signal $s_i$, which preferably can store L samples, where L is the size of the FFT window, for delaying the input signal $s_i$ by an interval equal to the FFT window. This delayed version of the input signal is then subtracted from the input signal. The modulus of the input signal or the difference signal is computed. The circuit has a second delay circuit, which delays the modulus for a first predetermined interval. An adder/subtracter subtracts the delayed modulus from the modulus and adds a feedback signal taken from a register that accumulates the result of the adder/subtracter. A lookup memory, addressed according to the output of the adder/subtracter, holds the logarithm of the result produced by the adder/subtracter. A third delay circuit, which provides a delay for a second predetermined interval, has an input connected to the lookup memory. A second subtracter has a first input connected to the lookup memory, and a second input connected to an output of the second delay circuit. A comparison circuit is connected to an output of the subtracter, for comparison thereof with a threshold value.

In one aspect of the invention, the circuit has a fourth delay circuit connected to the input signal $s_i$, which preferably can store fewer than L samples, while providing a delay for the active interval. A selector selects the first delay circuit or the fourth delay circuit.

According to a further aspect of the invention there is a module for computing a modulus of the input signal which is connected to the first delay circuit and the adder/subtracter.

According to another aspect of the invention a control circuit selects predetermined samples of the input signal for processing in the timing synchronization circuit allowing for selection of the evaluation interval relative to the symbols in the data stream.

BRIEF DESCRIPTION OF THE DRAWING

For a better understanding of these and other objects of the present invention, reference is made to the detailed description of the invention, by way of example, which is to be read in conjunction with the following drawings, wherein.

DESCRIPTION OF THE PREFERRED EMBODIMENT

Figure 1:
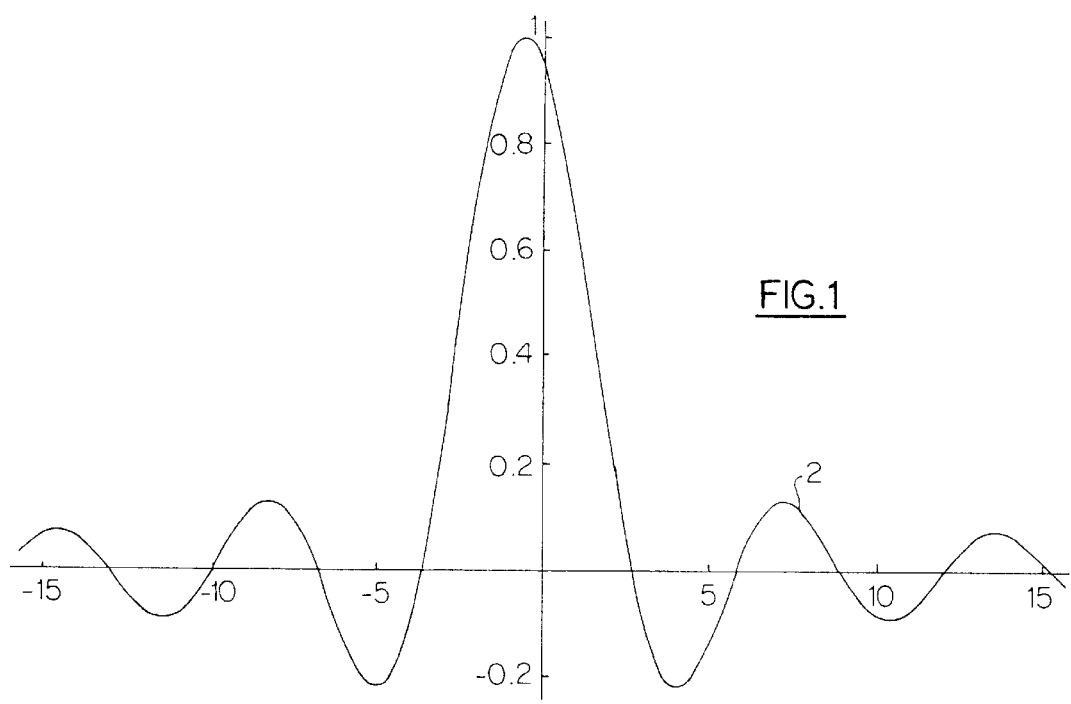
FIG. 1 illustrates the spectrum of a COFDM subchannel.
Figure 2:
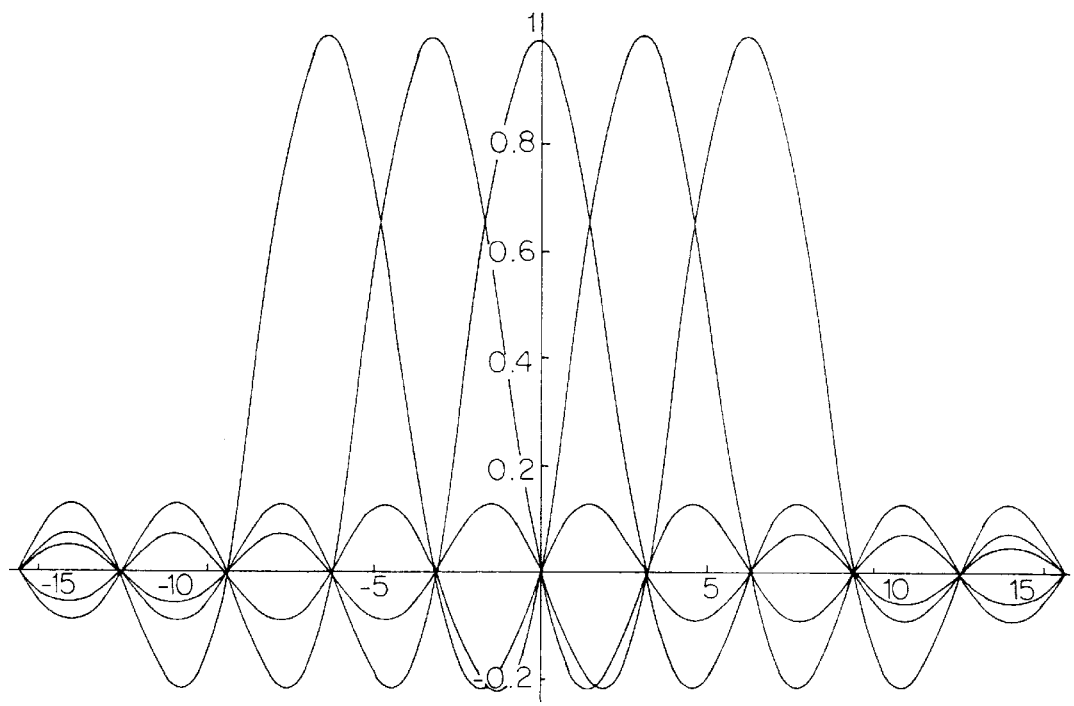
FIG. 2 shows a frequency spectrum for multiple carriers in a COFDM signal.
Figure 3:
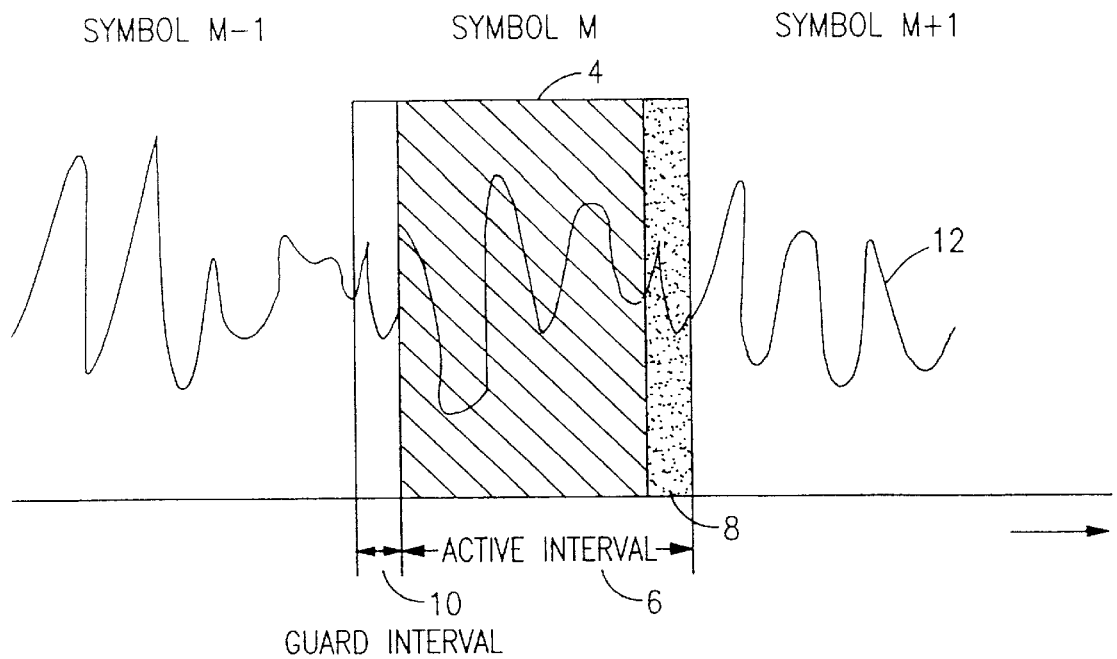
FIG. 3 is a diagram of a signal according to COFDM and shows a data symbol format.
Figure 5:
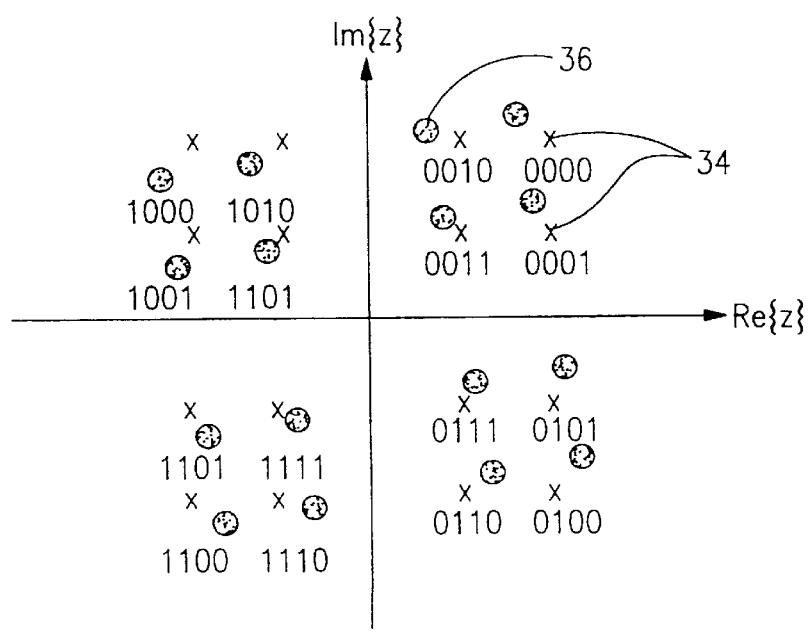
FIG. 5 illustrates certain perturbations in a COFDM signal constellation.
Figure 4:
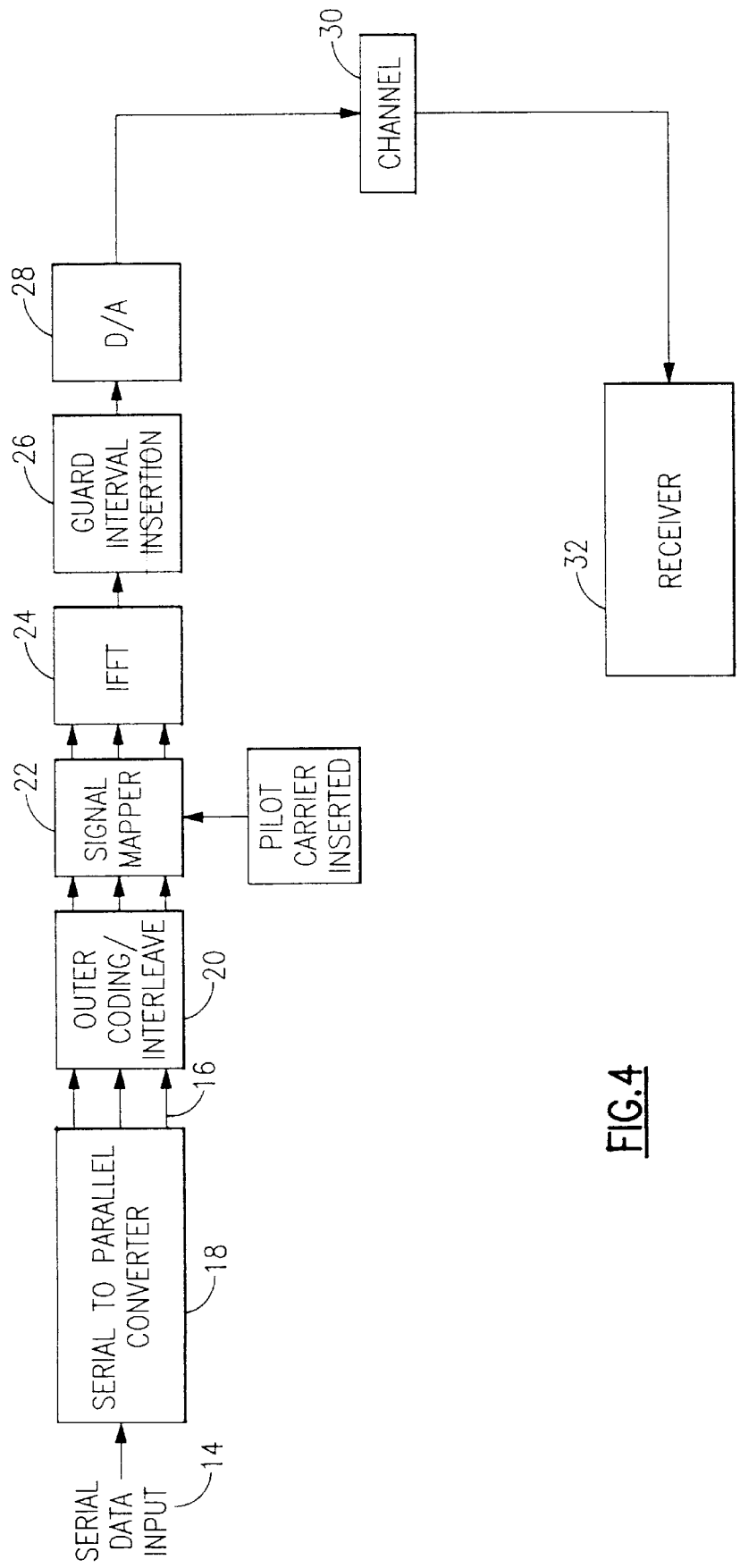
FIG. 4 is a block diagram illustrating an FFT based COFDM system.

Referring again to FIGS. 3 and 4, according to the invention a statistical method is applied to COFDM signals to find the end of the guard interval 10. This method is explained with reference to the above noted European Telecommunications Standard, but is applicable to many forms of frequency division multiplexing having prefixed or postfixed guard intervals. It allows the receiver 32 to find the end of the guard interval given only the received sampled complex signal (solid line 12) and the size of the active interval 6. The method relies on the fact that the guard interval 10 is a copy of the last part of the data symbol 4. In the receiver 32, due to echoes and noise from the channel and errors in the local oscillator, the guard interval 10 and the last part of the data symbol 4 will differ. If the errors introduced are random then a statistical method can be applied. According to the invention, the received complex signal is sampled at a rate which is nearly identical to that used in the transmitter. A difference signal is found for a pair of received samples which are separated by a period of time which is as close as possible to the active interval 6. This period should be equal to the size of the fast fourier transform ("FFT") being applied (i.e. 2048 or 8192 samples). Let $$S_i = |s_i| - |s_{i-fftsize}| \tag{10}$$

where $S_i$ is the difference signal; $s_i$ and $s_{i-fftsize}$ are the current and previous complex input samples of which the modulus is taken. That is, the subscript "i" indexes a linear time sequence of input values. Assuming that the input signal is random, then $S_i$ is also random. Within the guard interval $s_i$ and $S_{i-fftsize}$ will be similar, although not identical, due to the effects of the channel. $S_i$ will be therefore a random signal with a small dispersion. As used herein the term "dispersion" means generally the spread of values, and is not restricted to a particular mathematical definition. In general the active part of one symbol is not related to the active part of the next symbol. Outside of the guard interval $S_i$ will be random with a much larger dispersion. In order to find the end of the guard interval, the dispersion of the difference signal $S_i$ is monitored to look for a significant increase which will occur at the boundary of the guard interval 10 and the active interval 6. The inventors have also observed that a large decrease in dispersion is seen at the start of the guard interval 10.

According to a preferred embodiment of the invention samples of the input signal are stored over an interval which includes at least one symbol period $T_s$. The dispersion of the difference signal $S_i$ is calculated over a block of samples. The block is moved back in time over a number of samples, n, and the dispersion is recalculated. These two blocks are referred to herein as "comparison blocks". The ratio of a current dispersion in a first comparison block to the dispersion in a previous comparison block is found. Then, the F ratio significance test is used to find significant differences in the dispersions of the two comparison blocks. The F ratio is defined as $$F = \frac{\text{VAR}(i)}{\text{VAR}(i-n)} \quad (11)$$

where n is a positive integer, i indexes the input samples, and VAR(i) is the variance of a block of values of length N samples. Variance can be defined as $$\text{VAR}(i) = \frac{1}{N}\sum_{j=0}^{N}(S_{i-j})^2 - \left(\frac{1}{N}\sum_{j=0}^{N}S_{i-j}\right)^2 \quad (12)$$

While the F ratio significance test is used in the preferred embodiment, other functions of the two dispersion values which give a signal relating to the change in dispersion could be used. There are many such functions. An advantage of the F ratio is that for a random input signal it has a known probability distribution, allowing convenient statistical analysis for purposes of performance analysis and system design. Also the F ratio intrinsically normalizes the signal, making the result independent of the signal level.

Figure 6:
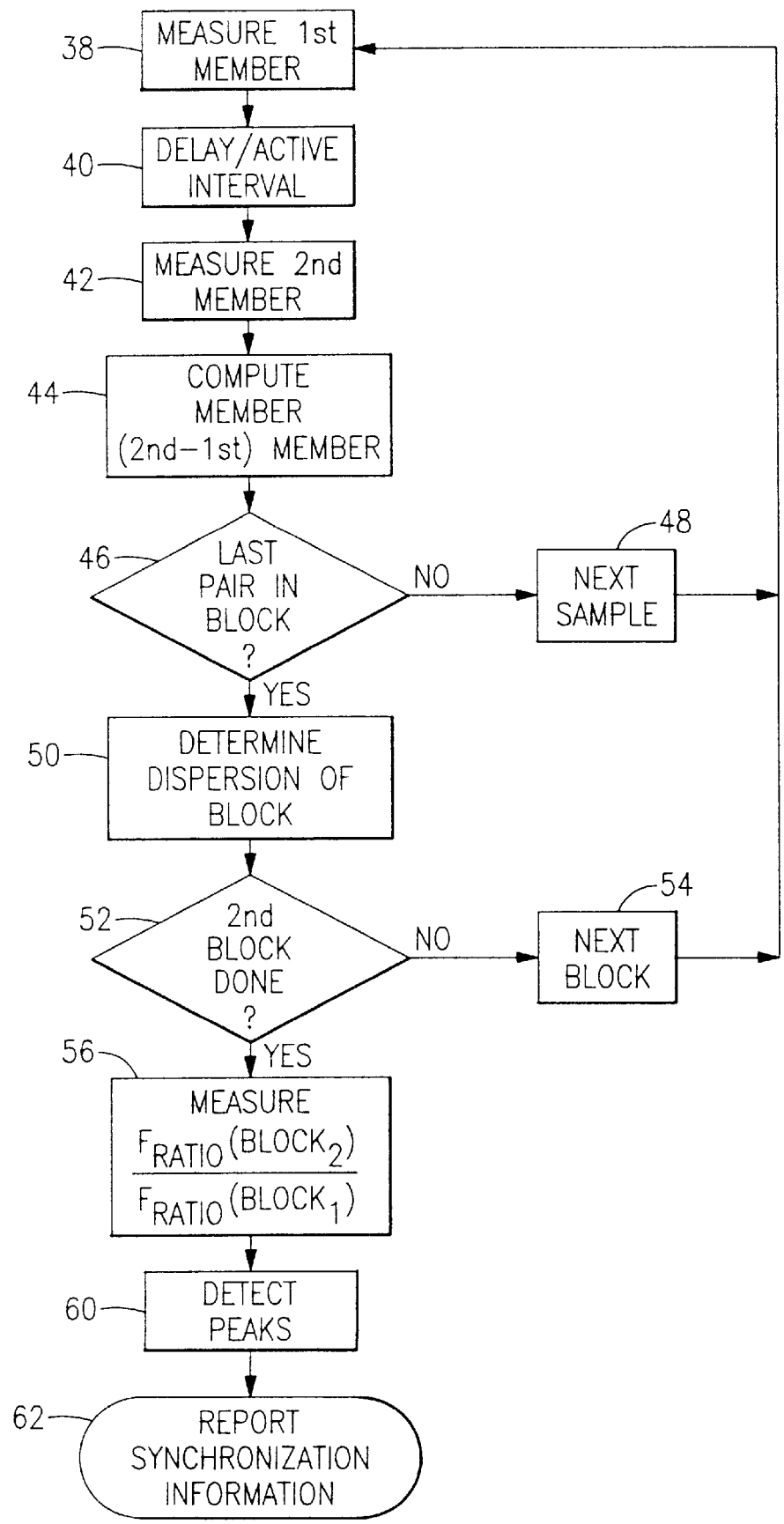
FIG. 6 is a flow diagram of a method of timing synchronization according to a preferred embodiment of the invention.

The method is disclosed with reference to FIG. 6, in which a first member of a sample pair in a current evaluation block is measured at step 38. A delay of one active interval 6 (FIG. 3) is experienced in step 40. This may be accomplished with a digital delay such as a FIFO, or equivalently by buffering samples for an active interval in a memory and accessing appropriate cells of the memory. A second member of the sample pair is measured in step 42, and the difference between the first and second member is determined and stored in step 44. The end of the current block is tested at decision step 46. The size of the evaluation block should not exceed the length of a guard interval, and may be considerably smaller. In the event the end of the current block has not yet been reached, another sample is acquired at step 48, and control returns to step 38.

If the end of the current block has been reached, the dispersion of the current block is measured in step 50, and is treated as one of two comparison blocks of data. A test is made at decision step 52 to determine if a group of two comparison blocks have been evaluated. If this test is negative, then another block of data is acquired in step 54, after which control returns to step 38. The other block of data need not be contiguous with the block just completed.

In the event the test at decision step 52 is positive, the F ratio is computed for the group of two comparison blocks at step 56. The results obtained in step 56 are submitted to peak detection in step 60. Peak detection optionally includes statistical tests of significance, as is explained hereinbelow.

If peaks are detected, then the boundary of a guard interval is established in step 62 for purposes of synchronization of the FFT window which is necessary for further signal reconstruction. If peaks are not detected, the above process is repeated with a block of samples taken from another portion of the data stream.

EXAMPLE 1

Figure 7:
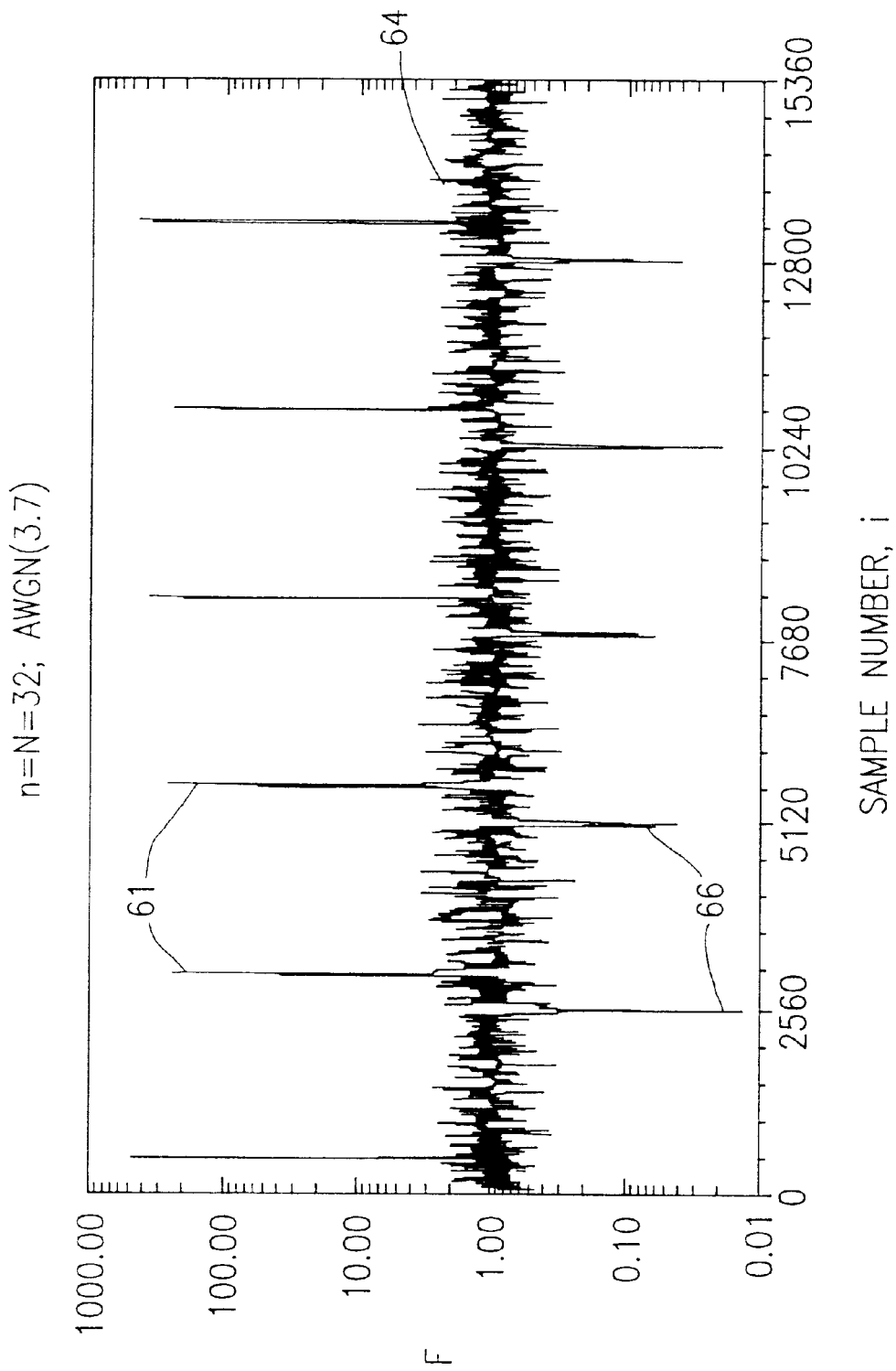
FIG. 7 is a plot of an F ratio test performed on several data symbols for coarse timing synchronization.

Referring now to FIG. 7 a complex signal was generated according to the above noted European Telecommunications standard using a random number generator, and transmitted across a Ricean channel model together with added white Gaussian noise (SNR=3.7). Data symbols were then analyzed according to the above described method. The results 6 data symbols are shown in FIG. 7, wherein the F ratio is plotted for convenience of presentation on a logarithmic axis as line 64, because the spikes 66, 68, at the beginning and end of the guard intervals respectively, are very large.

Figure 8:
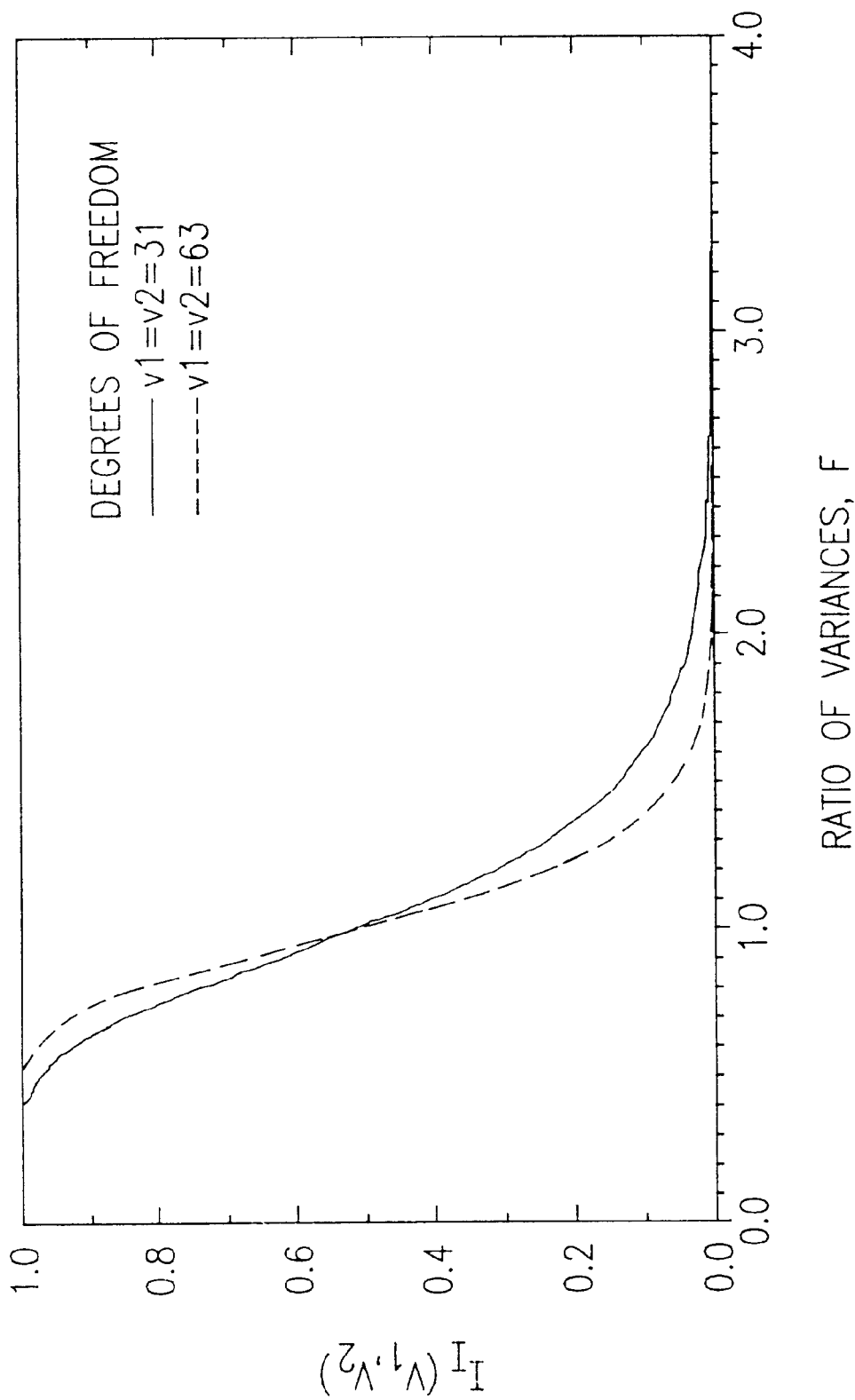
FIG. 8 is a plot of an incomplete beta function for different degrees of freedom.

Although it is quite evident from FIG. 7 that the ends of the guard intervals are easy to find using any of several well known peak detectors, it is possible to apply a statistical test to more accurately answer the question: do the two blocks of samples have the same dispersion? This is the null hypothesis, $H_0$, i.e. the dispersion is the same and the observed spike in F is due to random fluctuations only. If $H_0$ has very low probability it can be rejected, which would correspond to detection of the start or end of the guard interval. From the way the COFDM symbol is constructed $H_0$ is expected to be true for comparison blocks lying entirely within the guard interval or within the active interval, but false when the comparison blocks straddle a boundary at the start or end of the guard interval. If comparison blocks of random samples are drawn from the same population then the probability of F is given by $$Q(F \mid v_1, v_2) = I_x\left(\frac{v_1}{2}, \frac{v_2}{2}\right) \quad (13)$$

where I() is the incomplete Beta function, $$x = \frac{v_2}{v_2 + v_1 F} \quad (14)$$

and $v_1$ and $v_2$ are the number of degrees of freedom with which the first and second dispersions are estimated. In this example v1=v2=(N−1) if n>=N. The shape of the function is shown in FIG. 8. From a statistical point of view n should be sufficiently large so that the two blocks do not overlap, i.e. n>=N. If the blocks do overlap, then the calculation of the second dispersion will use samples used for the calculation of the first dispersion. This effectively reduces the number of degrees of freedom and hence the significance of the result. It has been determined that setting n=N works well.

Figure 9:
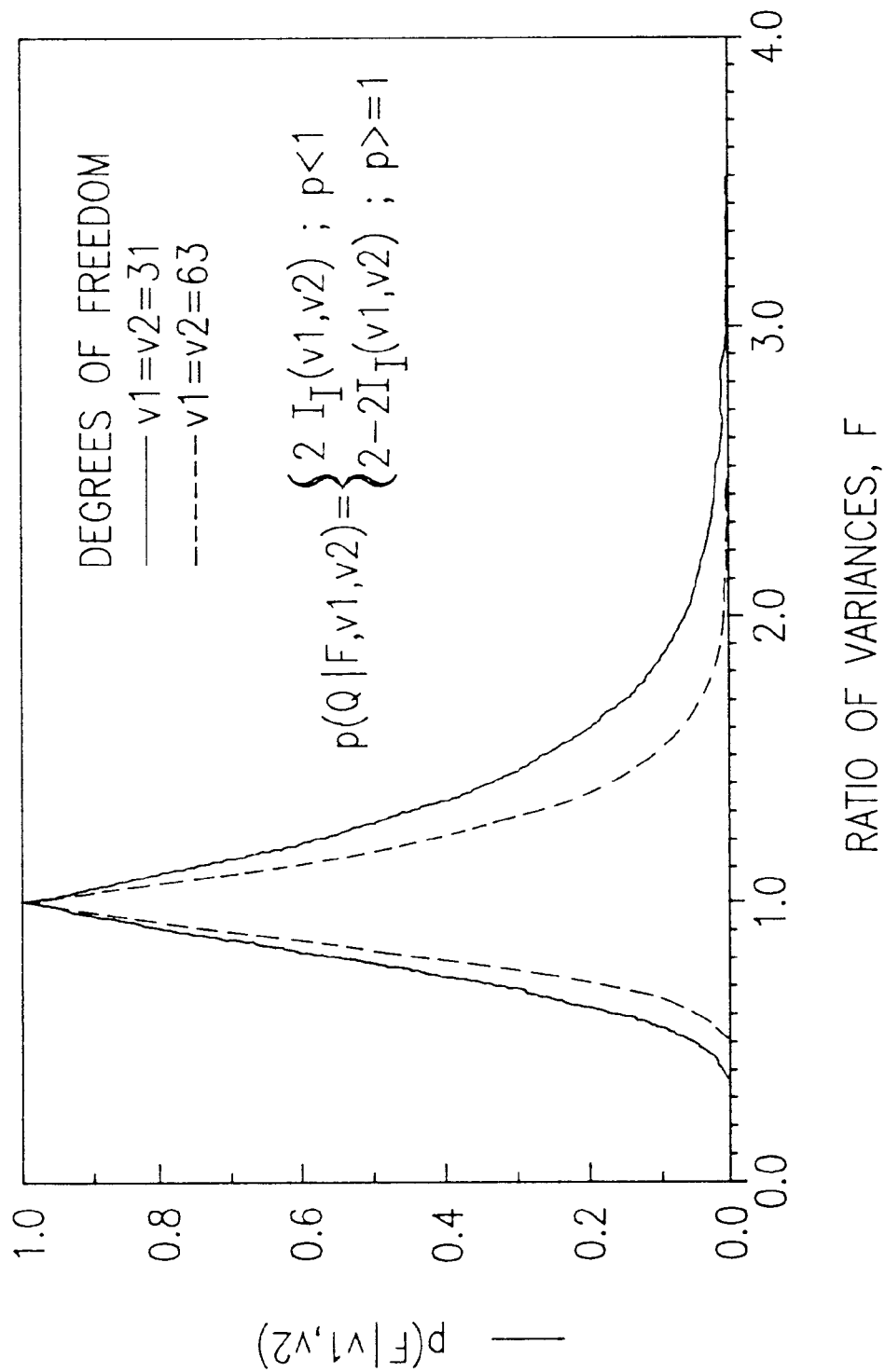
FIG. 9 is a plot helpful in understanding a test of statistical significance according to the invention.

The function Q( ) in equation (13) actually gives the one-tailed probability. $H_0$ could be rejected if F is either very large or very small, and so the two-tailed test is required. Actually the two tails are identical, so for a two-tailed test the probability is double that given in equation (13). However, this results in values of probability greater than one for F<1. The probability, p, is therefore calculated as follows:

$$p = 2I_x\left(\frac{v_1}{2}, \frac{v_2}{2}\right) \quad (15)$$

and then, if (p>1), p=2−p. This probability reflects the viability of $H_0$. Thus if p is small, $H_0$ can be rejected and it can be stated, with a specified degree of certainty, that the comparison blocks come from sample populations with different dispersion. The noted European Telecommunications Standard specification states that the block size, N, should be 32 for a correlation algorithm. N={32,64} have been successfully tried. The probability functions obtained are shown in FIG. 9 using these values for N. In the preferred embodiment p<=0.05 has been set for the rejection of $H_0$.

A precise implementation would be to calculate F, then x, then the incomplete Beta function, then p and then apply the threshold test. This algorithm would be very difficult to realize in hardware since the Beta function is very complicated. In the preferred embodiment it is much simpler, and gives the same results, to set the acceptance threshold and N parameter, and thus define an upper and lower limit for F. It is then only necessary to calculate F and compare it with the limits. In order to simply find the end of the guard interval it may be safely assumed that F>1. Only the upper limit on F is needed. To calculate the limits on F accurately, a suitable root-finding method, such as Newton-Raphson may be utilized. Typical values are given in Table 1.

TABLE 1

| p threshold | v1 = v2 = 31 | | v1 = v2 = 63 | |
|---|---|---|---|---|
| | F_lower | F_upper | F_lower | F_upper |
| 0.2 | 0.627419 | 1.593832 | 0.722591 | 1.383909 |
| 0.1 | 0.548808 | 1.822132 | 0.658620 | 1.518326 |
| 0.05 | 0.488143 | 2.048582 | 0.607525 | 1.646022 |
| 0.01 | 0.386894 | 2.584689 | 0.518205 | 1.929738 |
| 0.005 | 0.354055 | 2.824422 | 0.487936 | 2.049448 |
| 0.001 | 0.293234 | 3.410251 | 0.429794 | 2.326695 |
| $10^{-4}$ | | 4.337235 | | |
| $10^{-5}$ | | 5.393528 | | |
| $10^{-6}$ | | 6.605896 | | |
| $10^{-7}$ | | 8.002969 | | |
| $10^{-8}$ | | 9.616664 | | |

This method has been successfully tested using the specified channel model with additive white Gaussian noise (SNR=3.7).

The formula for dispersion given in Equation (12) would require a multiplier for implementation in silicon. The calculation of F is a division in which the (N-1) normalisation constants cancel out as long as the two blocks have the same size. Accurate multiplication and division can be expensive in silicon. In the preferred embodiment simplifications have been implemented which give less accurate, but still viable, values for F. $S_i$ can be assumed to have zero mean so it is not necessary to calculate the mean from the block of samples. This also increases the number of degrees of freedom from (N-1) to N. Instead of calculating variance using the standard sum of squares formula, the dispersion can be estimated by the mean absolute deviation. The formula for VAR(i) becomes $$VAR(i) = \frac{1}{N}\left(\sum_{j=0}^{N-1} |S_{i-j}|\right)^2 \quad (16)$$

The (1/N) factor divides out in the calculation of F if the two blocks have the same size. But there still remains the division of the two dispersions and the squaring required. These can be tackled using logarithms to the base 2. Substituting from Equation (16) into Equation (11) gives $$F = \left(\frac{\sum_{j=0}^{N-1} |S_{i-j}|}{\sum_{j=0}^{N-1} |S_{i-n-j}|}\right)^2 = \left(\frac{S_a}{S_b}\right)^2 \quad (17)$$

Taking logs to the base 2 gives $$\log F = 2(\log s_a - \log s_b) = y \quad (18)$$

It is then only necessary to calculate y and compare it with the logarithm to the base 2 of the F upper limit. The comparison can be made by subtracting the log of the limit from 2(log 2sa-log 2sb) and comparing with zero. The factor of 2 can be absorbed into the limit.

Calculation of the logs to base two is relatively straightforward in hardware if the numbers are stored as fixed point fractions. The fractions can be split into an exponent and a fractional mantissa: $x=A2^B$. Taking log base 2 gives log $x$=log $A$+$B$. Since A is fractional it is practical to find its logarithm using a lookup table. The exponent B can be found from the position of the MSB (since $s_a$ and $s_b$ will both be positive numbers).

The calculation can thus be reduced to require only addition and subtraction arithmetic operations. The limit should also be recalculated using v1=v2=N if using this method. In practice, the significance level may be set empirically for a particular application, preferably p=0.05.

It will be appreciated by those skilled in the art that various measures of dispersion may be utilized without departing from the spirit of the invention, for example the standard deviation, skew, various moments, histograms, and other calculations known in the art.

In a first alternate embodiment of the invention, the above described method is employed using either the real or the imaginary parts of the signal instead of the modulus. This embodiment achieves economy in hardware.

In a second alternate embodiment of the invention, the n parameter of equation (11) has been optimized. At the end of the guard interval, the two blocks straddle more of the transition to the active interval, giving a well-defined increase in the dispersion. Using any value n>2 has the drawback that several successive points will give significant increases as the later block travels up to the boundary. This small problem is easily overcome by introducing a dead period after detection of the boundary. That is, once a spike has been detected a set of samples equal to the size of the FFT window is accepted before further attempts are made to locate another spike. The dead period has the added benefit of not introducing false spikes. When using larger values of n the spikes 66, 68 ( FIG. 7) increase, whilst the $H_0$ noisy F signal remain much the same.

EXAMPLE 2

The maximum F-spike height as a function of n has been measured systematically together with the background variation in F. The results are shown in Table 2.

TABLE 2

| (1) n | (2) <F> | (3) $F_{s.d}$ | (4) $F_{max}$ | (5) (4)/(3) |
|---|---|---|---|---|
| 3 | 1.0009 | 0.07 | 7.5 | 107 |
| 5 | 1.0012 | 0.10 | 10.7 | 107 |
| 10 | 1.0011 | 0.14 | 12.9 | 92 |
| 15 | 1.0014 | 0.17 | 16.7 | 98 |
| 20 | 1.0014 | 0.19 | 19.3 | 102 |
| 30 | 1.0012 | 0.23 | 20.9 | 91 |
| 40 | 0.9975 | 0.24 | 22.0 | 92 |
| 50 | 0.9926 | 0.25 | 20.4 | 81.6 |

Table 2 was developed using the first 5 frames of the signal analyzed in FIG. 7. The statistics in columns (2) and (3) of Table 2 were made by excluding any points where F>=3.0 to exclude spikes from the calculations. The spikes would otherwise affect the values of mean and standard deviation even though they are from a different statistical population.

The results indicate that the background variation in F, $F_{s.d.}$, was affected by n, increasing asymptotically to a value of approximately 0.28. It is likely that this is the effect of overlapping blocks. For example, for N=64 and n<64, the blocks over which the dispersions are calculated will contain some of the same values and therefore be correlated. To test this theory Fs.d. was evaluated for n>N, and the results are shown in Table 3.

TABLE 3

| n | $F_{s.d.}$ |
|---|---|
| 60 | 0.258 |
| 70 | 0.266 |
| 80 | 0.270 |
| 90 | 0.278 |
| 100 | 0.285 |
| 128 | 0.297 |
| 256 | 0.366 |

The dependence becomes linear at n>=N/2. If F is calculated every n samples, rather than every sample, then this dependence may be reduced. However, this creates a risk for small guard intervals of not having the first block wholly within the guard interval and the second wholly within the active interval.

Figure 10:
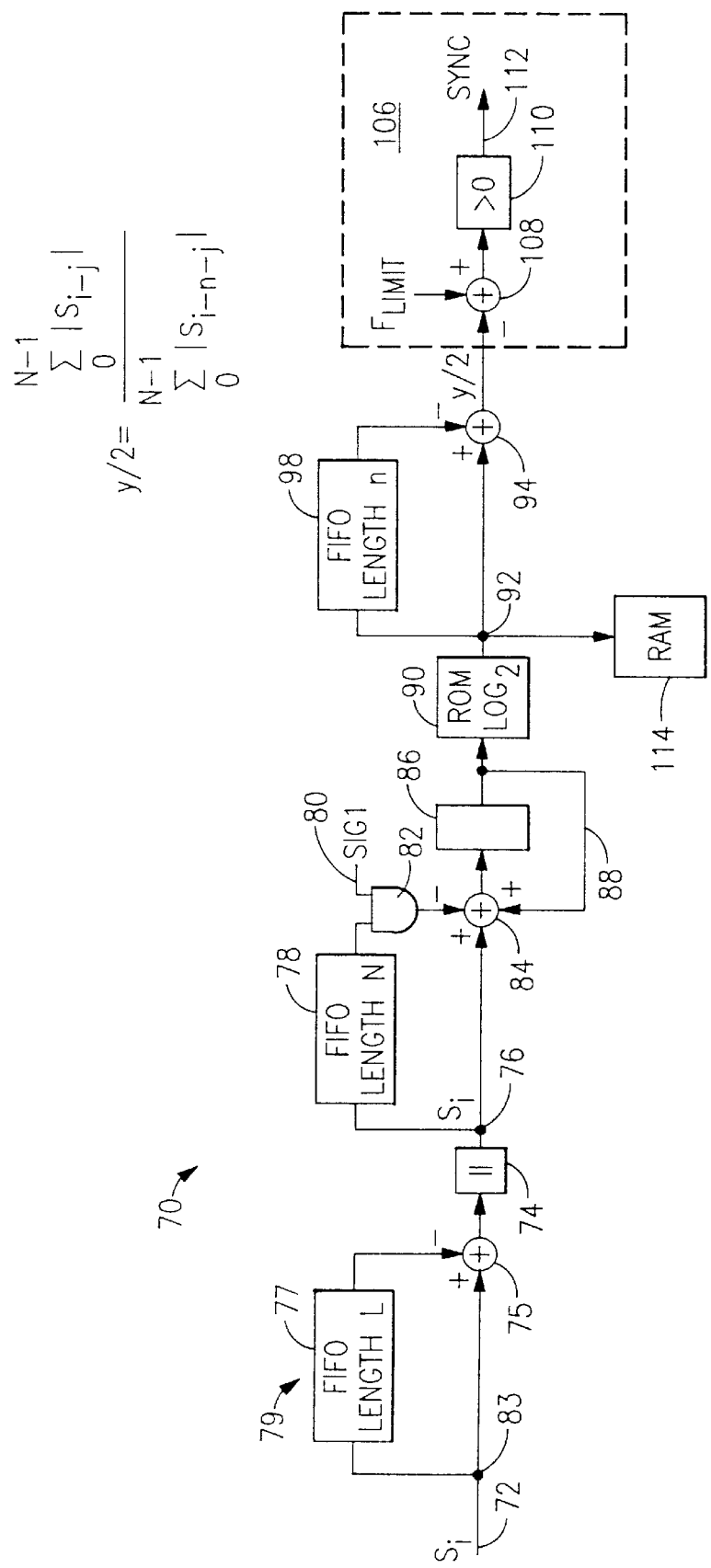
FIG. 10 is an electrical schematic of a synchronization circuit according to an alternate embodiment of the invention.

A third alternate embodiment of the invention is disclosed with reference to FIG. 10, which schematically illustrates a timing synchronization circuit 70. The circuit accepts a complex input signal 72, and includes a circuit module 74 which develops the modulus of its input, which is taken from node 83. The circuit module 74 insures that the value being subsequently processed is an unsigned number. The input to the circuit module 74 is a difference signal which is developed by a subtracter 75 which takes as inputs the input signal 72 and a delayed version of the input signal 72 which has been processed through a delay circuit 79, preferably realized as a FIFO 77 of length L, where L is the size of the FFT window. As explained above, it is also possible to operate this circuit where the input signal 72 is real, imaginary, or complex, or even the modulus of a complex number. In the case where the input signal 72 is real, or imaginary, the circuit module 74 can be modified, and can be any known circuit that removes the sign of the output of the subtracter 75, or equivalently sets the sign so that the outputs accumulate monotonically; i.e. the circuit has a unipolar output. The output of the circuit module 74 is ultimately clocked into a digital delay, which is preferably implemented as a FIFO 78. When the FIFO 78 is full, a signal SIG1 80 is asserted, and the output of the FIFO 78 becomes available, as indicated by the AND gate 82. An adder/subtracter circuit 84 is also connected to the node 76, and its output is stored in a register 86. A delayed version of the output of the adder/subtracter circuit 84 is taken from the register 86 and fed back as a second input to the adder/subtracter circuit 84 on line 88. In the event the signal SIG1 80 has been asserted, a version of the output of the circuit module 74, delayed by a first predetermined interval N, where N is the number of samples in the comparison blocks, is subtracted from the signal on node 76.

The signal on line 88 is an index into a lookup table, preferably implemented as a read-only-memory ("ROM"), and shown as ROM 90. The address of the ROM 90 contains the logarithm to the base 2 of the magnitude of the signal on line 88, which then appears at node 92. The node 92 is connected to a subtracter 94, and to a delay circuit, shown as FIFO 98, which is used to develop the denominator of the middle term of equation (17).

The subtracter 94 produces a signal which is compared against the $\log_2$ of a predetermined threshold value $F_{LIMIT}$ in a comparison circuit 106, shown for simplicity as an adder 108 connected to a comparator 110. The output signal SYNC 112 is asserted when the boundary of a guard interval has been located.

Although not implemented in the presently preferred embodiment, it is also possible to configure the size of the FIFO 77 dynamically, so that the size of the interval being evaluated can be adjusted according to operating conditions. This may conveniently be done by storing the values on the node 92 in a RAM 114 for computation of their dispersion.

Figure 11:
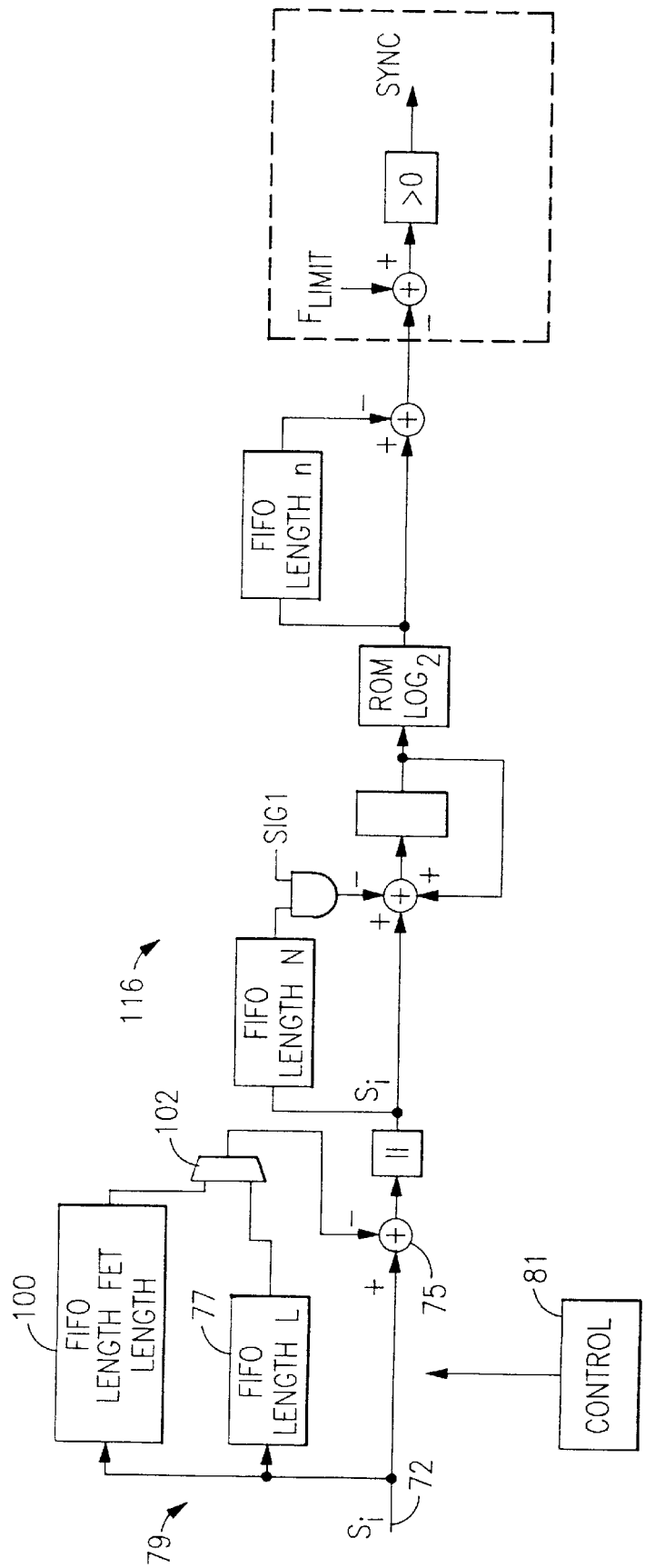
FIG. 11 is an electrical schematic of a synchronization circuit according to another alternate embodiment of the invention.

In a fourth alternate embodiment of the invention, explained with reference to FIG. 11, components similar to those of the embodiment shown in FIG. 10 have the same reference numerals. A timing synchronization circuit 116 is similar to the timing synchronization circuit 70, except now the delay circuit 79 is realized as the FIFO 77, and another FIFO 100, one of which is selected by a multiplexer 102. Both of the FIFOs 77, 100 provide the same delay; however the capacities of the two are different. The FIFO 100 provides for storage of samples taken in an interval equal to the size of the FFT window, and is normally selected in a first mode of operation, for example during channel acquisition, when it is necessary to evaluate an entire symbol in order to locate a boundary of a guard interval. In the noted European Telecommunications standard, up to 8K of data storage is required, with commensurate resource requirements. During subsequent operation, the approximate location of the guard interval boundaries will be known from the history of the previous symbols. In a second mode of operation, it is therefore only necessary to evaluate a much smaller interval in order to verify the exact location of the guard interval boundary. The number of samples used in the computation of the dispersion can be kept to a small number, preferably 32 or 64, and the much smaller FIFO 77 accordingly selected to hold the computed values. The resources saved thereby can be utilized for other functions in the demodulator, and memory utilized by the larger FIFO 100 may also be reallocated for other purposes.

A control block 81 optionally advances the evaluation interval relative to symbol boundaries in the data stream in successive symbols, and can also be used to delay for the dead period. Eventually the moving evaluation interval straddles the boundary of the current symbol's guard interval, and synchronization is then determined. The size of the evaluation interval is chosen to minimize the use of memory, yet to be large enough to achieve statistical significance in the evaluation interval. The size of the evaluation interval, and the FIFO 77 may be statically or dynamically configured.

While this invention has been explained with reference to the structure disclosed herein, it is not confined to the details set forth and this application is intended to cover any modifications and changes as may come within the scope of the following claims:

What is claimed is:

1. A method of determining the boundaries of symbols in a stream of data being transmitted through a channel and having a symbol period $T_s$, wherein the symbols comprise an active interval and a guard interval, said guard interval being a replication of a portion of said active interval, the method comprising the steps of:

sampling first portions of said stream, wherein said first portions are separated by said active interval to form a first comparison block of data;

measuring a first dispersion of said first comparison block;

sampling second portions of said stream, wherein said second portions are separated by said active interval to form a second comparison block of data;

measuring a second dispersion of said second comparison block; and calculating a statistic of said first dispersion and said second dispersion; and synchronizing said stream based on said statistic, for signal reconstruction by a fast Fourier transform.

2. The method according to claim 1, wherein said statistic comprises an F ratio.

3. The method according to claim 1, wherein said symbols are complex, and said samples consist of a selected one of a real component and an imaginary component thereof.

4. A method of decoding a stream of data symbols having a symbol period $T_s$, wherein the symbols comprise an active interval and a guard interval, said guard interval being a replication of a portion of said active interval, the method comprising the steps of:

sampling said stream at a sampling interval during an evaluation interval of said symbol period $T_s$;

associating samples in a plurality of pairs, each said pair having a first member and a second member, each said first member being separated in said stream from said second member by said active interval, wherein said first members and said second members lie in a first block and a second block respectively, and said first block and said second block are no larger than said guard interval;

for each said pair, determining a function of said first member and said second member of each said pair, and outputting a first output signal that is representative of said function;

measuring a dispersion of said first output signal;

outputting a second output signal representative of said dispersion;

displacing said first block and said second block relative said stream, and repeating said steps of associating samples, determining a function, measuring a dispersion and outputting a third output signal;

comparing said second output signal with said third output signal and outputting a fourth output signal that is representative of said comparison; and detecting a predetermined criterion in said fourth output signal, wherein said criterion indicates boundaries of said guard interval and said active interval; and synchronizing an FFT window using said predetermined criterion for signal reconstruction.

5. The method according to claim 4, further comprising adjusting a sign of said first output signal to yield a unipolar signal.

6. The method according to claim 4, wherein said step of sampling said stream comprises sampling an imaginary component thereof.

7. The method according to claim 4, wherein said step of sampling said stream further comprises determining a modulus of said samples.

8. The method according to claim 4, wherein said criterion is a predetermined magnitude.

9. The method according to claim 4, wherein said criterion is a maximum or a minimum value.

10. The method according to claim 4, wherein following said step of displacing said first block and said second block relative said stream, said first block is noncontiguous with said displaced first block and said second block is noncontiguous with said displaced second block.

11. The method according to claim 4, wherein in a first operating mode said evaluation interval has a first value, and in a second operating mode, said evaluation interval has a second value.

12. The method according to claim 11, further comprising the steps of, in said second operating mode:

memorizing the dispersion of said location of said guard interval in successive symbols; and adjusting said second value of said evaluation interval in response to said memorized dispersion.

13. The method according to claim 4, further comprising the step of following said step of detecting a predetermined criterion in said fourth output signal, accepting a set of samples for an active interval before detecting a boundary of a subsequent guard interval.

14. A method of decoding a stream of data symbols having a symbol period $T_s$, wherein the symbols comprise an active interval and a guard interval, said guard interval being a cyclic extension of a portion of said active interval, the method comprising the steps of:

sampling said stream at a sampling interval during an evaluation interval of said symbol period $T_s$;

associating samples in a plurality of pairs, each said pair having a first member and a second member, each said first member being separated in said stream from said second member by said active interval, wherein said first members and said second members lie in a first block and a second block respectively, and said first block and said second block are no larger than said guard interval;

for each said pair, determining a function of said first member and said second member of each said pair, and outputting a first output signal that is representative of said function;

measuring a dispersion of said first output signal;

outputting a second output signal representative of said dispersion;

displacing said first block and said second block relative said stream, and repeating said steps of associating samples, determining a function, measuring a dispersion and outputting a third output signal;

comparing said second output signal with said third output signal and outputting a fourth output signal that is representative of said comparison; and detecting a predetermined criterion in said fourth output signal, wherein said criterion indicates boundaries of said guard interval and said active interval; and synchronizing an FFT window using said predetermined criterion for signal reconstruction.

15. The method according to claim 14, wherein said step of sampling said stream comprises sampling a real component thereof.

16. The method according to claim 14, wherein said step of sampling said stream comprises sampling an imaginary component thereof.

17. The method according to claim 14, further comprising adjusting a sign of said first output signal to yield a unipolar signal.

18. The method according to claim 14, wherein said criterion is a predetermined magnitude.

19. The method according to claim 14, wherein said criterion is a maximum or a minimum value.

20. The method according to claim 14, wherein in a first operating mode said evaluation interval has a first value, and in a second operating mode, said evaluation interval has a second value.

21. The method according to claim 20, further comprising the steps of, in said second operating mode:

memorizing the dispersion of said location of said guard interval in successive symbols; and adjusting said second value of said evaluation interval in response to said memorized dispersion.

22. The method according to claim 14, wherein said step of detecting a predetermined criterion in said fourth output signal further comprises performing a test of statistical significance.

23. The method according to claim 14, further comprising the step of following said step of detecting a predetermined criterion in said fourth output signal, accepting a set of samples for an active interval before detecting a boundary of a subsequent guard interval.

24. A method of decoding a stream of data symbols having a symbol period $T_s$, wherein the symbols comprise an active interval and a guard interval, said guard interval being a cyclic extension of a terminal portion of said active interval, the method comprising the steps of:

sampling said stream at a sampling interval for an evaluation interval of said symbol period $T_s$;

associating samples in a plurality of pairs, each said pair having a first member and a second member, each said first member being separated in said stream from said second member by said active interval, wherein said first members and said second members lie in a first block and a second block respectively, and said first block and said second block are no larger than said guard interval;

for each said pair, determining a difference of said first member and said second member of each said pair, and outputting a first output signal that is representative of said difference;

measuring the dispersion of the magnitudes of said first output signal;

outputting a second output signal representative of said dispersion;

displacing said first block and said second block relative said stream, and repeating said steps of associating samples, determining a difference, measuring a dispersion and outputting a third output signal;

determining an F ratio of a magnitude of said second output signal and a magnitude of said third output signal and outputting a fourth output signal that is representative of said F ratio; and detecting a predetermined magnitude in said fourth output signal, wherein said magnitude indicates boundaries of said guard interval and said active interval; and synchronizing an FFT window using said predetermined criterion for signal reconstruction.

25. The method according to claim 24, wherein said step of sampling said stream comprises sampling a real component thereof.

26. The method according to claim 24, wherein said step of sampling said stream comprises sampling an imaginary component thereof.

27. The method according to claim 24, further comprising adjusting a sign of said first output signal to yield a unipolar signal.

28. The method according to claim 24, wherein in a first operating mode said evaluation interval has a first value, and in a second operating mode, said evaluation interval has a second value.

29. The method according to claim 28, further comprising the steps of, in said second operating mode:

memorizing the dispersion of said location of said guard interval in successive symbols; and adjusting said second value of said evaluation interval in response to said memorized dispersion.

30. The method according to claim 24, wherein said step of determining an F ratio comprises evaluating a logarithm of the numerator of said F ratio and evaluating a logarithm of the denominator of said F ratio.

31. A method of timing synchronization for demodulating a signal that is modulated according to frequency division multiplexing, the signal comprising a stream of data symbols having a symbol period $T_s$, wherein the symbols comprise an active interval and a guard interval, said guard interval being a replication of a portion of said active interval, the method comprising the steps of:

temporally sampling said stream at a sampling interval for at least said symbol period $T_s$;

associating samples in a plurality of pairs, each said pair having a first member and a second member, each said first member being separated in said stream from said second member by said active interval, wherein said first members and said second members lie in a first block and a second block respectively, and said first block and said second block are no larger than said guard interval;

for each said pair, determining a difference of said first member and said second member of each said pair, and outputting a first output signal that is representative of said difference;

measuring the dispersion of the magnitudes of said first output signal;

outputting a second output signal representative of said dispersion;

displacing said first block and said second block relative said stream, and repeating said steps of associating samples, determining a difference, measuring a dispersion and outputting a third output signal;

determining an F ratio of a magnitude of said second output signal and a magnitude of said third output signal and outputting a fourth output signal that is representative of said F ratio; and detecting a predetermined magnitude in said fourth output signal, wherein said magnitude indicates boundaries of said guard interval and said active interval; and synchronizing an FFT window using said predetermined criterion for signal reconstruction.

32. The method according to claim 31, wherein said step of sampling said stream comprises sampling a real component thereof.

33. The method according to claim 31, wherein said step of sampling said stream comprises sampling an imaginary component thereof.

34. The method according to claim 31, wherein said step of sampling said stream further comprises determining a modulus of said samples.

35. The method according to claim 31, wherein in a first operating mode said evaluation interval has a first value, and in a second operating mode, said evaluation interval has a second value.

36. The method according to claim 35, further comprising the steps of, in said second operating mode:

memorizing the dispersion of said location of said guard interval in successive symbols; and adjusting said second value of said evaluation interval in response to said memorized dispersion.

37. The method according to claim 31, further comprising the step of following said step of detecting a predetermined criterion in said fourth output signal, accepting a set of samples for an active interval before detecting a boundary of a subsequent guard interval.

38. The method according to claim 31, wherein said step of determining an F ratio comprises evaluating a logarithm of the numerator of said F ratio and evaluating a logarithm of the denominator of said F ratio.

39. A demodulator for a frequency division multiplexed signal, the signal comprising a stream of data symbols having a symbol period $T_s$, wherein the symbols comprise an active interval and a guard interval, said guard interval being a replication of a portion of said active interval, wherein the improvement comprises a timing synchronization circuit for locating a boundary of said guard interval, the circuit comprising:

a first delay circuit, providing a delay for a first predetermined interval, and accepting a sampled input signal;

a first subtracter, for subtracting an output of said first delay circuit from said input signal;

a first circuit coupled to said first subtracter for producing a signal having an unipolar magnitude that is proportional to an input thereof;

a second delay circuit coupled to an output of said first circuit;

an adder/subtracter circuit, having a first input coupled said output of said first circuit, a second input connected to an output of said second delay circuit, and a third input;

a register for accumulating the output of said adder/subtracter circuit, wherein said register is connected to said third input;

a lookup memory, addressed according to said output of said adder/subtracter circuit, for accessing a logarithm of said output of said adder;

a third delay circuit, providing a delay for a second predetermined interval, and having an input connected to said lookup memory;

a second subtracter having a first input connected to said lookup memory, and a second input connected to an output of said third delay circuit; and a comparison circuit, connected to an output of said second subtracter, for comparison thereof with a threshold value.

40. The demodulator according to claim 39, wherein said first delay circuit comprises:

a first FIFO for storing a first predetermined number of samples of said input signal;

a second FIFO for storing a second predetermined number of samples of said input signal; and a selector for selecting one of said first FIFO and said second FIFO.

41. The demodulator according to claim 39, wherein said first circuit comprises a circuit for computing a modulus of a complex signal.

42. The demodulator according to claim 39, further comprising a control circuit for selecting predetermined samples of said input signal for processing in said timing synchronization circuit.

* * * * *